May 4, 1948.     W. J. O'BRIEN     2,440,755

RADIO FREQUENCY NAVIGATION SYSTEM

Filed Aug. 27, 1945     4 Sheets-Sheet 1

INVENTOR.
WILLIAM J. O'BRIEN
BY
Attorney

Patented May 4, 1948

2,440,755

UNITED STATES PATENT OFFICE 2,440,755

RADIO-FREQUENCY NAVIGATION SYSTEM

William J. O'Brien, London, England, assignor to The Decca Record Company, Limited, London, England, a corporation of Great Britain Application August 27, 1945, Serial No. 613,002

8 Claims. (Cl. 343—105)

My invention relates to radio beacon systems and radio frequency navigational systems, and has particular reference to a method and apparatus for producing equi-phase displacement radio frequency field contours and for the utilisation thereof for guiding the navigation of mobile vehicles.

In my copending application Serial No. 612,987, filed August 27, 1945, and entitled Navigation system, I have disclosed a radio frequency navigational system of the equi-phase displacement type in which transmissions of unlike but related radio frequency signals from fixed transmitting locations and bearing a fixed multiple phase relation to each other are used to establish field patterns comprising contours of equal multiple phase relation. In the system disclosed the transmitters are ordinarily separated a considerable number of wavelengths in order to increase the sensitivity of the system. When the system is used by vehicles located at great distances from the transmitting apparatus and particularly at night, errors in indication are usually introduced by the reception of sky wave signals. Under those circumstances the increased sensitivity of the system becomes a disadvantage rather than an advantage as it gives rise to the possibility of an ambiguous or erroneous indication.

The present invention is directed to an improved type of radio beacon system intended to produce the same accuracy as regards location determinations but in which the sensitivity is reduced to thereby minimize the possibility of ambiguous or erroneous indications resulting from sky wave reception.

It is an object of my invention to provide a radio frequency navigational system of the equi-phase displacement type in which deviation of a mobile vehicle from a given guide path are indicated in terms of phase displacements based on a relatively low frequency, the transmitting equipment being constructed to produce an accurate multiple lane field based upon transmitting frequencies many times the frequency at which the phase comparison is made.

It is also an object of my invention to provide a navigational system of the character set forth in the preceding paragraph in which two pair of radio frequency signals of unlike but related frequencies are radiated from three spaced points.

It is a still further object of my invention to provide a system of the character set forth in the preceding paragraphs in which the frequency difference between the signals of each of the two pair of signals is equal.

It is also an object of my invention to provide in a system of the character set forth in the preceding paragraphs a radio frequency receiving apparatus for receiving the four frequencies transmitted by the transmitting apparatus and for determining the multiple phase relation among the four frequencies at the location of the receiver to thereby indicate the location of the mobile receiver with respect to a predetermined guide path.

It is a still further object of my invention to provide a radio frequency navigational system in which a radio frequency signal of given frequency is radiated continuously from one point while two radio frequency signals of unlike but related frequencies are simultaneously radiated from another point and in which the radiation of said simultaneous signals is alternated between said other point and a third point.

It is additionally an object of my invention to provide a receiving apparatus for use with transmitting equipment of the character described in the preceding paragraphs which includes means for simultaneously receiving the three transmitted signals together with means for measuring the multiple phase relation among said signals, said receiving equipment including also a pair of phase angle indicators together with switching mechanism for connecting said indicators alternately with the said phase angle measuring apparatus in synchronism with the alternations of said dual frequency transmissions.

Other objects and advantages of my invention will be apparent from a study of the following specification read in connection with the accompanying drawings, wherein, Fig. 1 is a diagram illustrating the relative locations of three transmitting antennae employed in the navigational system of my invention.

Figure 6:
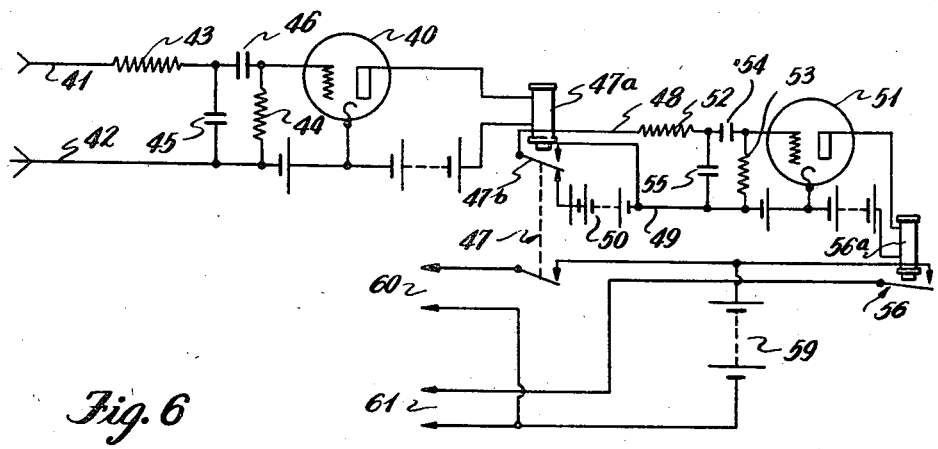
Fig. 6 is a wiring diagram illustrating a novel relay control circuit used to control the switching of the phase angle indicating devices used in the receiver shown in Fig. 5.
Figure 7:
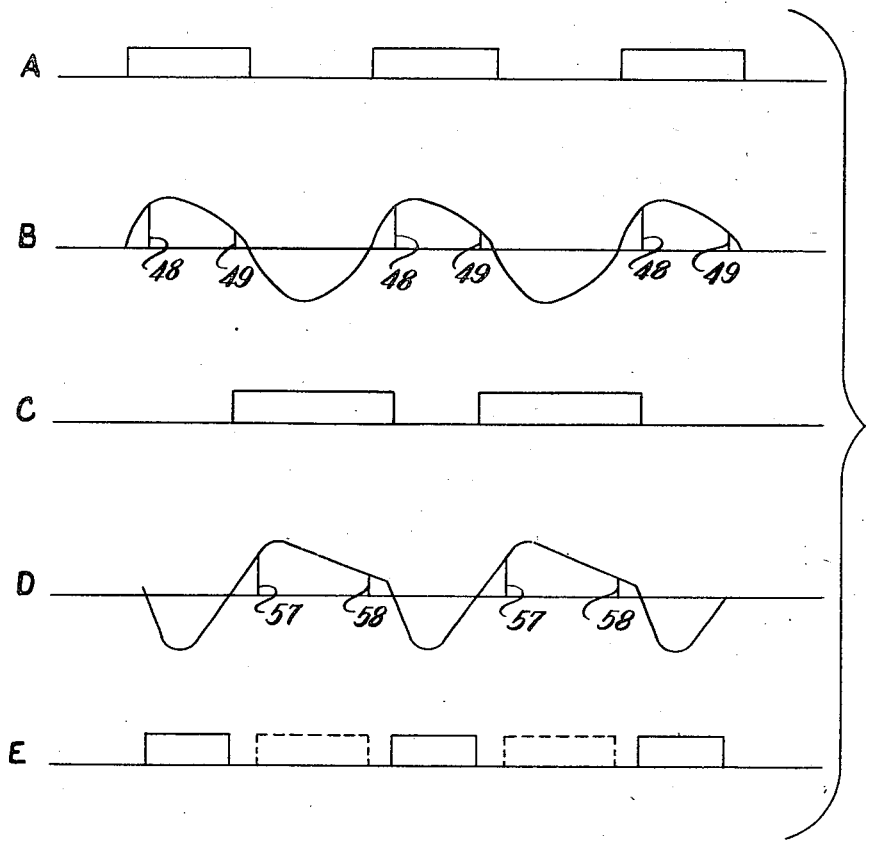

Fig. 7 comprises a series of graphs on Cartesian coordinates showing the time relationships among the potentials developed in the circuit shown in Fig. 6.

Referring to the drawings, I have illustrated diagrammatically three radio frequency transmitting antennae A, B and C as being spaced from each other and located on the same straight line. These transmitting antennae are connected to transmitting apparatus such as that illustrated in Fig. 2 and intended to radiate from the antennae A, B and C radio frequency signals of unlike but related frequencies bearing a fixed multiple phase relation to each other.

Figure 1:
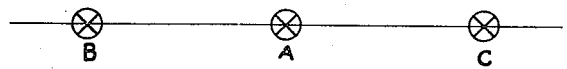
Figure 2:
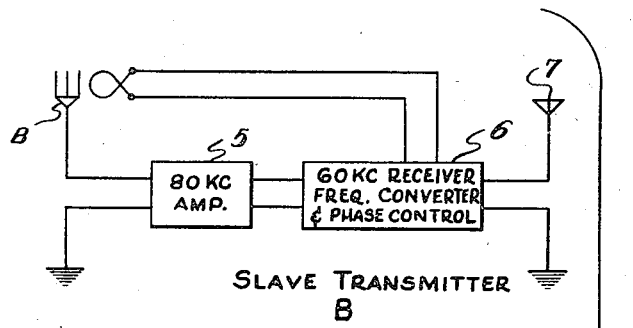
Fig. 2 is a block diagram illustrating the transmitting apparatus employed in one embodiment of my invention.
Figure 2:
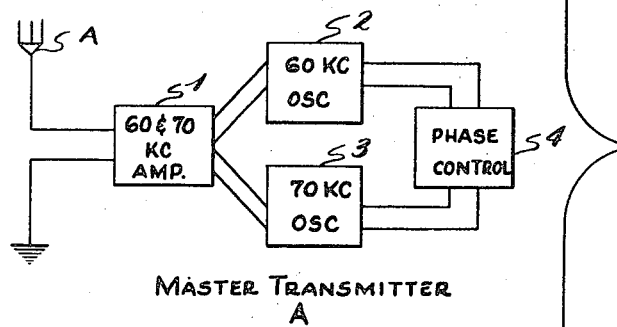
Figure 2:
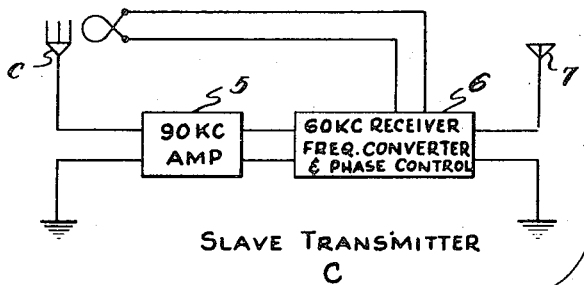

As shown in Fig. 2 the transmitter for driving antenna A is operated as a master transmitter while the antennae B and C are driven by slave transmitters each operating to receive radio frequency signals radiated from antenna A, to subject the received signals to a frequency conversion, and to re-radiate the converted signals at the new frequency.

The master transmitting apparatus includes an output amplifier 1 of suitable construction and design to pass two closely related frequencies as, for example, 60 and 70 kilocycles. The output of the amplifier 1 is coupled to the central antenna A whereas the input is coupled to the output of a 60 kilocycle oscillator 2 and a 70 kilocycle oscillator 3, the oscillators 2 and 3 being of any suitable type but dependently connected to each other so as to maintain a fixed frequency ratio. Furthermore, the two oscillators 2 and 3 are inter-tied through a phase control apparatus 4 operating to shift the phase of one of the oscillator signals with respect to the other in such a way as to maintain a fixed and unchanging phase relation between the two signals.

Except for the frequencies involved the slave transmitters B and C may be identical. They include output amplifiers 5 tuned to the corresponding frequency as, for example, 80 and 90 kilocycles respectively. The amplifiers 5 are driven by drive and control equipment indicated diagrammatically as comprising the rectangle 6. Such equipment includes a receiving apparatus coupled to a receiving antenna 7 for receiving the 60 kilocycle signals radiated from antenna A. The receiving apparatus works into suitable amplifying and frequency conversion equipment for producing an 80 or 90 kilocycle output which is used to excite the amplifiers 5. Furthermore, there is included within the equipment designated generally by the rectangle 6 phase control apparatus serving to compare the phase of the signals radiated from the slave antennae with the signals received from the master transmitter and operating to adjust the phase of the transmitted signals in accordance with any changes detected to thereby maintain a fixed and unchanging multiple phase relationship among the signals transmitted from antennae A, B and C.

For a complete disclosure and description of operation of the frequency conversion and phase control equipment reference should be had to my copending application Serial No. 612,987, filed August 27, 1945, and entitled Navigation system.

Figure 3:
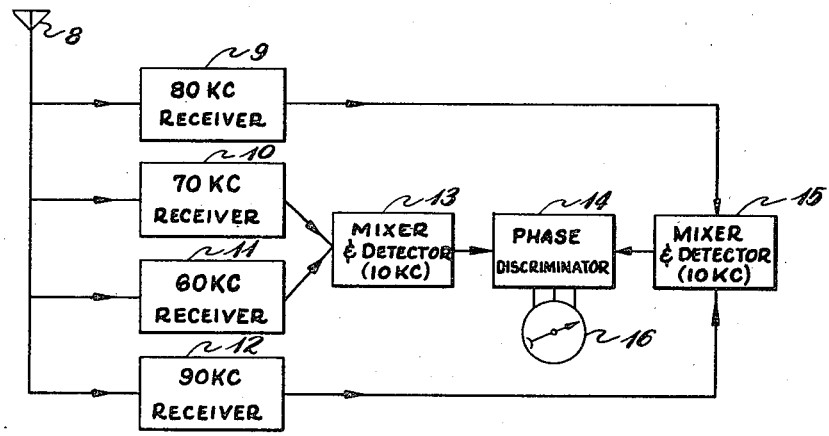
Fig. 3 is a block diagram illustrating one type of receiving apparatus which may be used with transmitting equipment of the character shown in Fig. 2.

In Fig. 3 I have illustrated receiving apparatus which is particularly adapted for use with a transmitting system of the character just described. This apparatus includes a receiving antenna 8 of suitable construction and coupled to four radio frequency amplifiers or receivers 9, 10, 11 and 12 tuned respectively to frequencies of 80, 70, 60 and 90 kilocycles. The output of receivers 10 and 11 is combined in a mixer and detector circuit 13 operating to produce as an output a 10 kilocycle signal resulting from heterodyning the 60 and 70 kilocycle outputs from amplifiers 10 and 11.

The 10 kilocycle signal developed by the mixer and detector 13 is applied to one input of a phase discriminator circuit 14. In like manner the 80 and 90 kilocycle output signals from receivers 9 and 12 are combined in a mixer and amplifier circuit 15 serving to produce a 10 kilocycle output signal resulting from heterodyning the two input frequencies. The resulting 10 kilocycle signal is applied to the other input circuit of the phase discriminator 14. To the output of the phase discriminator 14 there is coupled a phase angle indicating device 16 of suitable construction and operating to indicate the phase relation between the two 10 kilocycle signals applied to the input circuits of the phase discriminator 14.

The phase discriminator circuit 14 and the phase angle indicator 16 may be of any suitable construction but a preference is expressed for the phase discriminator circuit shown and described in my copending application Serial No. 612,991, filed August 27, 1945, and entitled Multiple channel radio frequency receiver, and for the phase angle indicating device illustrated and described in my copending application Serial No. 612,984, filed August 27, 1945 and entitled Registering Goniometer.

Attention is directed to the fact that with the apparatus just described the receiving equipment shown in Fig. 3 may be used for guide path indications of one sensitivity, or receiving equipment of the character disclosed in my aforementioned copending application Serial No. 612,991 may be used to give a location indication on a pattern of somewhat greater sensitivity. If as a distance scale there is chosen as a unit distance one-half wavelength at a frequency of 10 kilocycles then the equi-phase displacement field pattern which is measured by the receiving apparatus shown in Fig. 3 consists of a single lane embracing a full electrical circle for each unit spacing of the transmitters B and C. If on the other hand the receiving apparatus is of the type disclosed in my aforementioned copending application Serial No. 612,991 the position indicating coordinate system consists of intersecting equi-phase displacement fields containing respectively 18 and 24 lanes per unit spacing of the transmitters B and C from transmitter A. Thus, with the transmitting apparatus hereinbefore described there may be used one type of receiver to obtain a sensitive and accurate indication of the geographical location of the mobile vehicle, while by using alternatively the receiving apparatus described herein there may be obtained a somewhat less sensitive indication of the position of the vehicle with respect to a predetermined course line.

Figure 4:
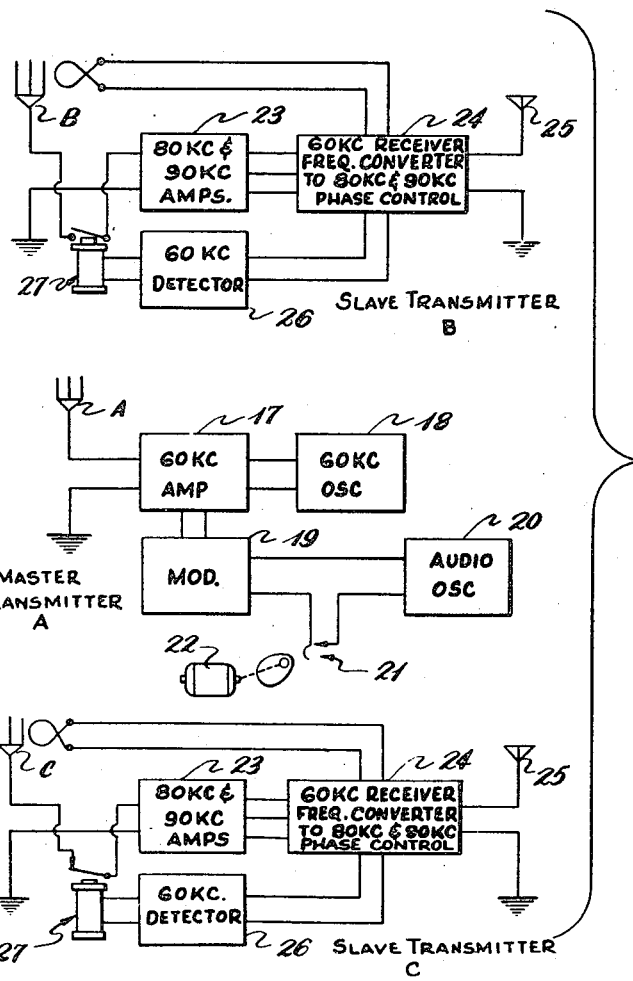
Fig. 4 is a block diagram illustrating the transmitting equipment which may be used in accordance with an alternate modification of my invention.

In Fig. 4 I have illustrated alternative transmitting equipment which may be used to excite antennae A, B and C. As in the previously described modification the antenna A is excited from a master transmitter while the transmitting equipment used to excite antennae B and C is of the slave type serving to receive signals radiated from antenna A, subject those signals to a frequency conversion and re-radiate the converted signals from antennae B and C.

The master transmitting equipment includes a 60 kilocycle amplifier 17 coupled to excite antenna A and to be excited from a 60 kilocycle oscillator 18 of suitable construction. In addition, there is included a modulator 19 coupled to an oscillator 20 adapted to produce a low frequency signal preferably of an audible frequency. The circuit connecting the audio oscillator 20 to the modulator 19 includes a cam operated switch indicated generally at 21 adapted to be driven at a continuous rate as by an electrical motor 22. The cam is arranged to complete the circuit between the oscillator 20 and the modulator 19 for short periods of time spaced by other periods of substantially equal duration during which the circuit is open. When the circuit is completed the modulator 19 operates to modulate the 60 kilocycle radio frequency signal amplified by amplifier 17. Therefore, the signal radiated from antenna A comprises a continuous transmission at 60 kilocycles but periodically modulated at a low frequency.

Except for a slight difference to be pointed out hereinafter the transmitting equipment for antennae B and C are identical and include power amplifiers 23 connected respectively to antennae B and C. The amplifiers 23 are of the dual channel type adapted to amplify both 80 and 90 kilocycle input signals. These signals are derived from receiving and control equipment represented generally by the rectangle bearing the reference character 24. That equipment includes a 60 kilocycle receiving apparatus connected to a receiving antenna 25 and adapted to receive the 60 kilocycle transmissions from antenna A. These signals are applied to frequency conversion equipment serving to produce two output frequencies of 80 and 90 kilocycles respectively which are applied to the power amplifiers 23. There is included within the equipment 24 phase controlling apparatus operating to maintain a constant and unchanging multiple phase relation among the 60, 80 and 90 kilocycle transmissions.

A part of the 60 kilocycle output from the receiving apparatus included within the equipment 24 is coupled as shown to a 60 kilocycle detector circuit 26 the output of which is connected to the coil of a relay 27. Contacts of the relay 27 are imposed in the antenna lead connecting antennae B or C to the power amplifier 23. In the case of antenna B the contacts are of the normally open type arranged to be closed upon energisation of the relay 27 whereas in the case of antenna C the contacts are of the normally closed type arranged to be opened upon the energisation of the relay 27.

Since the relays 27 are energised during the period of transmission from antenna A of modulated signals and are de-energised during the transmission of unmodulated continuous wave signals it will be seen that antennae B and C are alternately excited in synchronism with the alternate or periodic modulation of the 60 kilocycle signals radiated from antenna A. It will furthermore be noted that antennae B and C radiate identical signals each consisting of simultaneous transmissions at 80 and 90 kilocycles.

Figure 5:
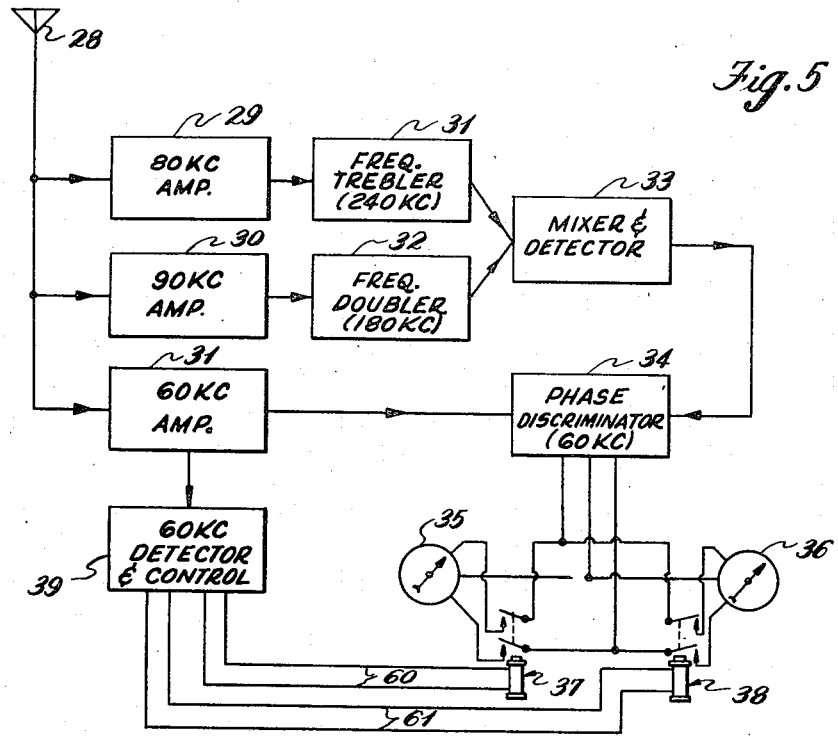
Fig. 5 is a block diagram illustrating one form of receiving apparatus which is particularly suitable for use with the transmitting apparatus shown in Fig. 4.

Fig. 5 illustrates diagrammatically a form of receiving apparatus which is particularly adapted for producing an indication of the geographical location of a vehicle equipped with such apparatus and operating to receive the signals radiated by the transmitting apparatus shown in Fig. 4. The receiving equipment includes a receiving antenna 28 of suitable type coupled respectively to three radio frequency amplifiers or receivers 29, 30 and 31 tuned respectively to frequencies of 80, 90 and 60 kilocycles. The output from the 80 kilocycle amplifier 29 is applied to a frequency trebling circuit 31 operating to produce an output signal having a frequency of 240 kilocycles. The 90 kilocycle output signal from the amplifier 30 is similarly applied to a frequency doubling circuit 32 operating to produce a 180 kilocycle output signal. The 180 and 240 kilocycle output signals from the frequency converting circuits 32 and 31 are combined and rectified in a mixer and detector circuit 33 serving to produce a 60 kilocycle output signal resulting from the heterodyning of the 180 and 240 kilocycle input signals. The resulting 60 kilocycle output is applied to one input circuit of a phase discriminator 34. The 60 kilocycle output signal from the amplifier 31 is applied to the other input circuit of the phase discriminator 34, the discriminator 34 operating to measure the phase relation between the two 60 kilocycle signals applied to the two input circuits thereof.

I have associated with the phase discriminator 34 two phase angle indicating devices 35 and 36. As will be described these devices are coupled to the discriminator in such a way as to operate alternately in synchronism with the alternations between locations of the radiation of the 80 and 90 kilocycle signals. For this reason the indicators 35 and 36 are connected to the signal output circuit of the phase discriminator 34 through normally open contacts of control relays 37 and 38. The coils of the relays 37 and 38 are coupled as shown to a 60 kilocycle detector and control circuit indicated generally by the rectangle bearing the reference character 39. The detector circuit included within the rectangle 39 is tuned to 60 kilocycles and coupled to receive a part of the 60 kilocycle output of amplifier 31.

I have shown in Fig. 6 control apparatus such as may comprise the control apparatus represented generally at 39 in Fig. 5. This apparatus includes a vacuum tube amplifier 40 the grid circuit of which is coupled as by conductors 41 and 42 to the output of the 60 kilocycle detector. The input circuit includes resistances 43 and 44 and condensers 45 and 46 connected as shown in Fig. 6 and operating to convert a square wave input into a quasi-sinusoidal grid signal.

In Fig. 7 I have indicated in graph A the character of signal applied between conductors 41 and 42 as a result of the rectification of the 60 kilocycle signals transmitted from antenna A. The rectangular signal pulses of positive polarity coincide in time with the periods during which the transmissions from antenna A are modulated. The curved line of graph B in Fig. 7 represents the grid signal applied to the grid of the vacuum tube 40. Since the plate current flow within the vacuum tube 40 follows the grid voltage changes the curved line of graphs B may be taken also as representative of the plate current flowing through the vacuum tube 40.

The plate circuit for the vacuum tube 40 includes a coil 47a of a relay indicated generally at 47. Since the relay is current responsive it will be alternately operated and released in accordance with the current flowing through the coil windings. In graph B of Fig. 7 I have indicated by the short vertical lines 48 and 49 the pick-up and drop-out current values of the coil 47a. It will be noted that the relay is operated a short time after the beginning of the transmission of the modulated signals and is de-energised a short time before the end of the modulated transmission.

The relay 47 includes a single pole, double throw switch 47b the movable blade of which is connected to a conductor 48. The two fixed contact members are connected to a conductor 49, the normally open contact being connected directly thereto and the normally closed contact being connected to the conductor 49 through a battery 50.

With this circuit the operation of the relay 47 causes a square wave potential of the character shown in graph C of Fig. 7 to be applied across conductors 48 and 49. These conductors comprise the input circuit of a vacuum tube 51 which circuit includes a filter consisting of resistances 52 and 53 and condensers 54 and 55 interconnected as shown. The filter operates to convert the square wave input into a quasi-sinusoidal wave form of the character represented by the curved line in graph D of Fig. 7. Since this curved line is representative of the voltage applied to the grid of the tube 51 it is likewise representative of the plate current drawn by the tube.

The plate circuit for the tube 51 includes a coil 56a of a relay represented generally at 56. Since the relay coil 56a is current responsive the relay will be operated alternately in accordance with the variations of plate current drawn by the tube 51. The short vertical lines 57 and 58 in graph D of Fig. 7 are representative respectively of the pick-up and drop-out values of the relay coil 56a. An inspection of Fig. 7 will show that the contacts of relay 56 are operated a short time after the beginning of the square wave input signal shown in graph C and are restored to their normal position a short time before the end of the input pulse.

Each of the relays 47 and 56 include normally open contacts which are connected in circuit with a suitable source of power such as a battery 59 to output circuits 60 and 61. The relay contacts are arranged to energise the associated output circuits during the time the relay is in its operated position. The circuits 60 and 61 are those which are connected to the coils of the relays 37 and 38. As is shown in graph E of Fig. 7 the apparatus just described operates to alternately energise relays 37 and 38 with delay periods between each operation during which both of the relays 37 and 38 are de-energised. It will be noted that these delay periods are divided on either side of the instant of the beginning or end of the transmission of a modulated signal from antenna A.

Therefore, phase indicator 35 will be connected to the phase discriminator 34 a short time after the beginning of the modulation of the A signal and will be disconnected a short time before the end of that signal. Alternately relay 38 will be energised to connect phase indicator 36 to the discriminator 34 a short time after the end of the transmission of the modulated signal and disconnect the indicator 36 a short time before the beginning of transmission of a modulated signal.

The delay periods during which both indicators are disconnected permit the transmitting apparatus and the receiving apparatus to stabilize and prevent spurious indications from being given by the indicators 35 and 36. The phase indicators 35 and 36 include no restoring spring so that when they are disconnected they maintain the indication obtaining at the time they were disconnected. I prefer to use a switching cycle of about three seconds so that each indicator is operative about one third of the time for periods of approximately one second. Since the time during which each indicator is inoperative is relatively short the indicators in effect both give a continuous indication, one representative of the location of the vehicle with respect to the equi-phase displacement lines developed by transmitting antennae A and B and the other giving the other coordinate represented by the equi-phase displacement contours generated by antennae A and C.

Attention is directed to the fact that with transmitting and receiving equipment of the character shown in Figs. 4 and 5 there are produced identical field patterns between the A and B signals and between the A and C signals, each pattern having a sensitivity of twelve lanes (each comprising a full electrical circle) for each unit distance of one half wavelength at a frequency of 10 kilocycles separation of antennae B and C from antenna A. If as is disclosed in my first aforementioned copending application frequencies of 80 and 90 kilocycles were transmitted continuously from antennae B and C respectively the resulting pattern would comprise 24 lanes and 18 lanes per unit distance separation.

Therefore, with the system disclosed herein a wider separation of the transmitters B and C from transmitter A may be employed to obtain the same total number of lanes with a corresponding reduction in the error produced by sky wave reception. For example, in the system just described a one degree phase angle error in the 60 kilocycle signals will produce a one degree error in the indication given by the indicators 35 and 36. If the sensitivity of the system described in my first aforementioned copending application were reduced to equality with that of the present system by employing a closer spacing between the transmitters the corresponding error resulting from a one degree displacement of the 60 kilocycle signals would be four degrees.

While I have shown and described the preferred embodiment of my invention I do not desire to be limited to the details of construction which have been shown and described herein except as defined in the appended claims.

I claim:

1. In a radio frequency navigation system, the combination of: three transmitting antennae spaced from each other; means for radiating simultaneously from the intermediate one of said antennae two radio frequency signals of different frequency and bearing a fixed multiple phase relation to each other; means for radiating respectively from the end ones of said three antennae other radio frequency signals of unlike frequency differing by the same amount as said two signals and each bearing a fixed multiple phase relation to one of said two signals.

2. In a radio frequency navigation system for guiding the navigation of a mobile vehicle, the combination of: three transmitting antennae spaced from each other; means for radiating simultaneously from the intermediate one of said antennae two radio frequency signals of different frequency and bearing a fixed multiple phase relation to each other; means for radiating respectively from the end ones of said three antennae other radio frequency signals of unlike frequency differing by the same amount as said two signals and each bearing a fixed multiple phase relation to one of said two signals; means at the location of said vehicle for simultaneously receiving said signals; means for mixing and rectifying said two signals to produce one output signal having a heterodyne frequency equal to the difference in frequency between said two signals; means for mixing and rectifying said other signals to produce another output signal having said heterodyne frequency; and means for measuring and indicating the phase relation between said output signals.

3. In a radio frequency navigation system, the combination of: three transmitting antennae spaced from each other; means for radiating continuously from the intermediate one of said three antennae radio frequency signals of a given frequency; transmitting means operable to radiate from each of the end antennae simultaneous radio frequency signals of different frequency different from said given frequency but bearing a fixed multiple phase relation thereto; and means for operating said transmitting means alternately.

4. In a radio frequency navigation system, the combination of: three transmitting antennae spaced from each other; means for radiating continuously from the intermediate one of said three antennae radio frequency signals of a given frequency; transmitting means operable to radiate from each of the end antennae simultaneous radio frequency signals of different frequency different from said given frequency but bearing a fixed multiple phase relation thereto; means for periodically modulating said signals of given frequency at a low frequency; receiving means at each of said transmitting means for receiving said signals of given frequency; and control means coupled to said receiving means and responsive to modulation of said signals of given frequency for operating said transmitting means alternately.

5. In a radio frequency navigation system for guiding the navigation of a mobile vehicle, the combination of: three transmitting antennae spaced from each other; means for radiating continuously from the intermediate one of said three antennae radio frequency signals of a given frequency; transmitting means operable to radiate from each of the end antennae simultaneous radio frequency signals of different frequency different from said given frequency but bearing a fixed multiple phase relation thereto; means for operating said transmitting means alternately; means at the location of said vehicle for simultaneously receiving said signals; frequency converting means for converting received signals of said different frequency respectively to higher frequencies equal to the least common multiples of each with said given frequency; means for mixing and rectifying said higher frequencies to produce an output signal of said given frequency; phase angle measuring means for measuring the phase relation between said output signal and the received signal of said given frequency; a pair of phase angle indicating devices; and means for connecting said devices alternately to said phase angle measuring means in synchronism with the alternate operation of said transmitting means.

6. In a radio frequency navigation system for guiding the navigation of a mobile vehicle, the combination of: three transmitting antennae spaced from each other; means for radiating continuously from the intermediate one of said three antennae radio frequency signals of a given frequency; transmitting means operable to radiate from each of the end antennae simultaneous radio frequency signals of different frequency different from said given frequency but bearing a fixed multiple phase relation thereto; means for operating said transmitting means alternately; means for periodically modulating said signals of given frequency at a low frequency; receiving means at each of said transmitting means for receiving said signals of given frequency; control means coupled to said receiving means and responsive to modulation of said signals of given frequency for operating said transmitting means alternately; means at the location of said vehicle for simultaneously receiving said signals; frequency converting means for converting received signals of said different frequency respectively to higher frequencies equal to the least common multiple of each with said given frequency; means for mixing and rectifying said higher frequencies to produce an output signal of said given frequency; phase angle measuring means for measuring the phase relation between said output signal and the received signal of said given frequency; a pair of phase angle indicating devices; and another control means at the location of said vehicle responsive to modulation of said signals of given frequency for connecting said devices alternately to said phase angle measuring means in synchronism with the alternate operation of said transmitting means.

7. In a radio frequency navigation system, the combination of: three transmitting antennae spaced from each other; means for radiating simultaneously from one of said antennae two radio frequency signals of different frequency and bearing a fixed multiple phase relation to each other; means for radiating respectively from the others of said three antennae other radio frequency signals of unlike frequency differing by the same amount as said two signals and each bearing a fixed multiple phase relation to one of said two signals.

8. In a radio frequency navigation system for guiding the navigation of a mobile vehicle, the combination of: three transmitting antennae spaced from each other; means for radiating simultaneously from one of said antennae two radio frequency signals of different frequency and bearing a fixed multiple phase relation to each other; means for radiating respectively from the others of said three antennae other radio frequency signals of unlike frequency differing by the same amount as said two signals and each bearing a fixed multiple phase relation to one of said two signals; means at the location of said vehicle for simultaneously receiving said signals; means for mixing and rectifying said two signals to produce one output signal having a heterodyne frequency equal to the difference in frequency between said two signals; means for mixing and rectifying said other signals to produce another output signal having said heterodyne frequency; and means for measuring and indicating the phase relation between said output signals.

WILLIAM J. O'BRIEN.